(No Model.) 2 Sheets—Sheet 1.
H. MacCOLL.
STERN BEARING FOR SCREW PROPELLER SHAFTS.
No. 505,666. Patented Sept. 26, 1893.
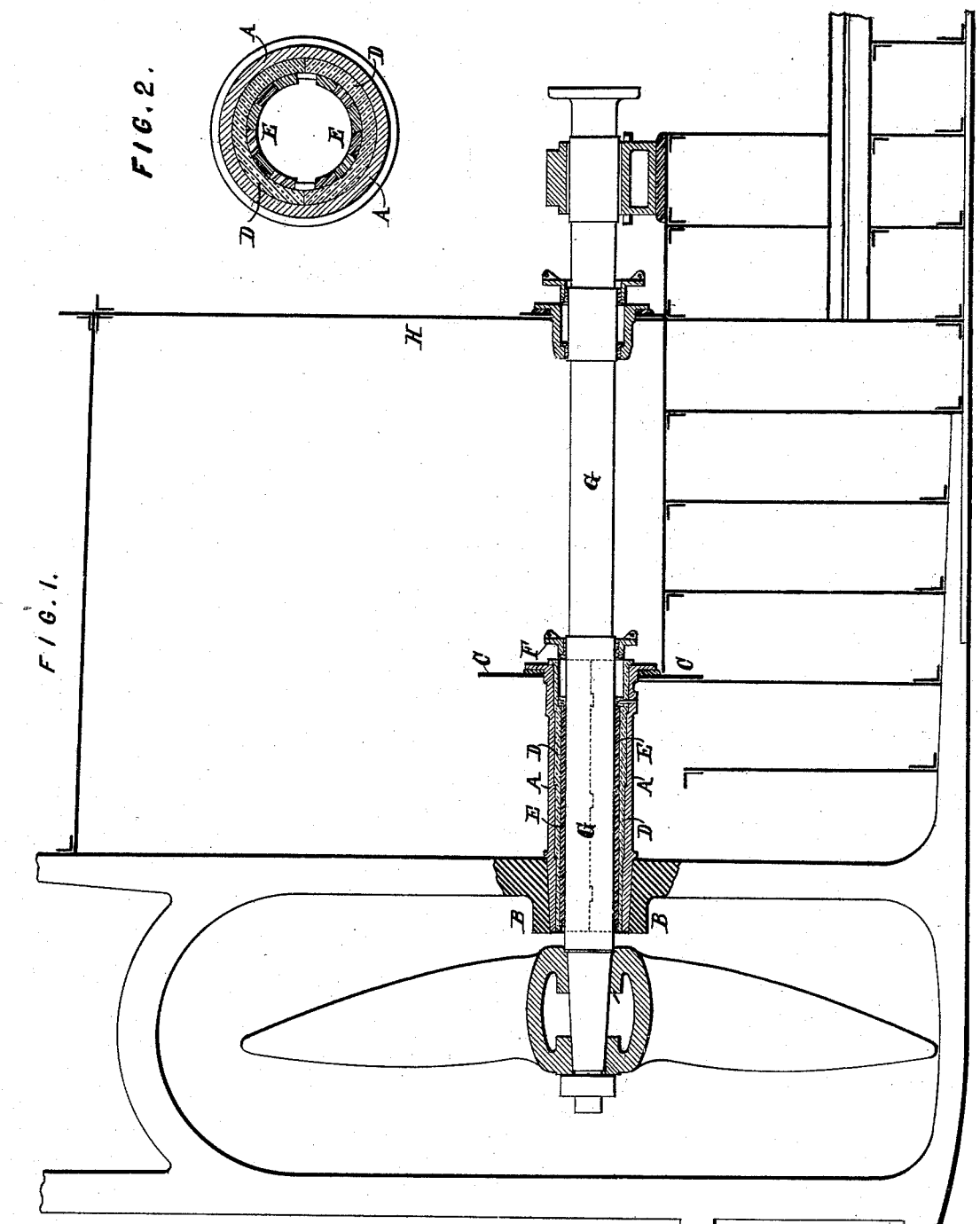
Witnesses
George Baumann
Edith J. Griswold
Inventor
Hector MacColl
By his Attorneys
Howson and Howson

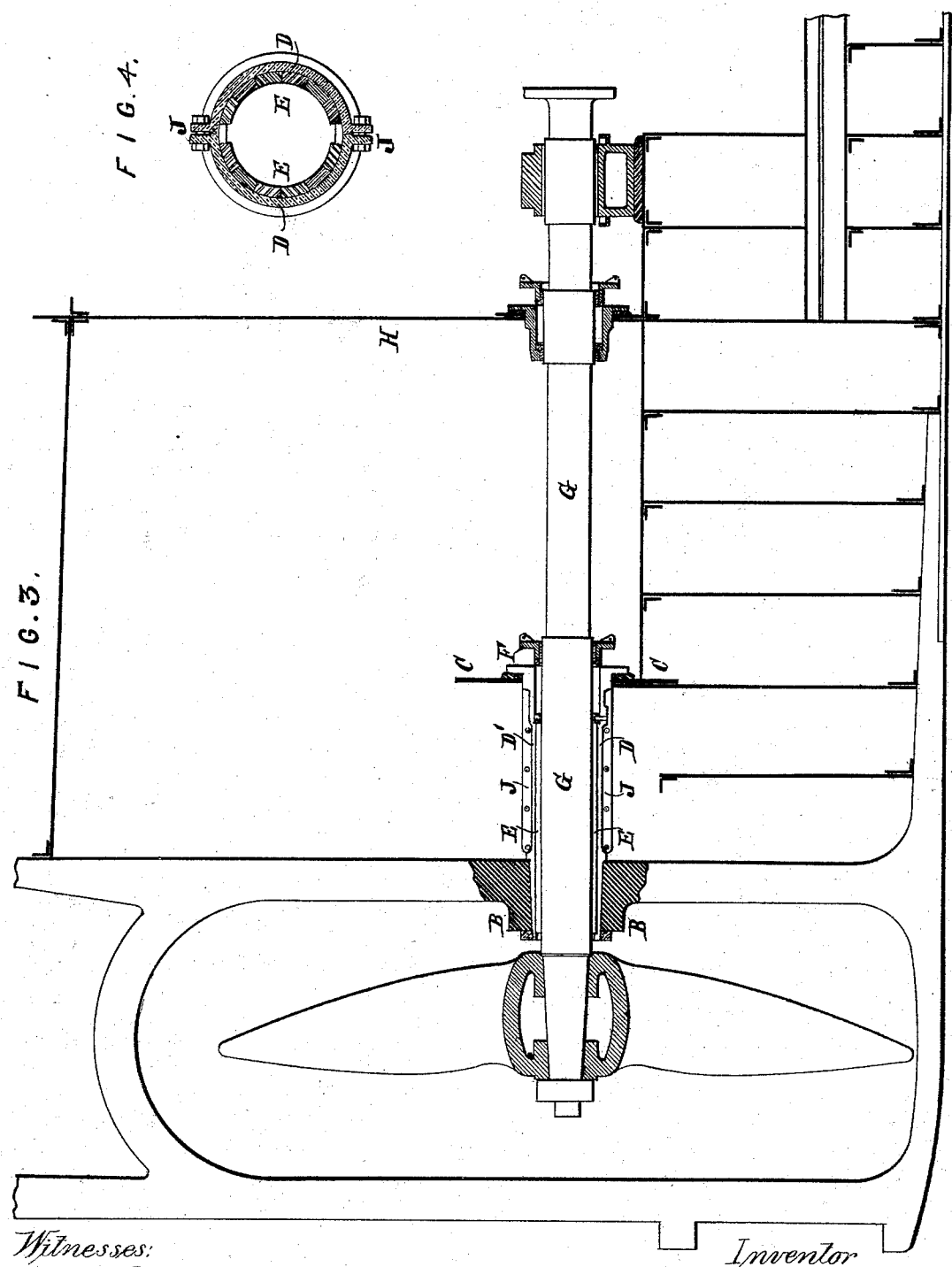

UNITED STATES PATENT OFFICE.

HECTOR MacCOLL, OF SAXONIA, STRANDTOWN, IRELAND.

STERN-BEARING FOR SCREW-PROPELLER SHAFTS.

SPECIFICATION forming part of Letters Patent No. 505,666, dated September 26, 1893.

Application filed May 22, 1893. Serial No. 475,125. (No model.)

*To all whom it may concern:*

Be it known that I, HECTOR MacCOLL, a subject of the Queen of Great Britain and Ireland, and a resident of Saxonia, Strandtown, county of Down, Ireland, have invented certain Improvements in Stern-Bearings for Screw-Propeller Shafts, of which the following is a specification.

My said invention has for its object to diminish the inconvenience, labor, time, expense, and risk, experienced with the ordinary arrangement of the stern tubes and bearings of screw-propeller shafts. And my said invention comprises devices and arrangements admitting of the stern bearing being drawn inward and of its being separated from the shaft in two or more parts, so that the stern bearing can be examined and put in order without removing the propeller or the stern length of shaft, the weight of these having simply to be suspended temporarily by any convenient means when the bearing is to be moved inward.

In the accompanying drawings, Figure 1, Sheet 1, is a longitudinal vertical section of the stern of a screw steamer showing the stern bearing; and Fig. 2, is an enlarged cross section of the bearing. Figs. 3 and 4, Sheet 2, are similar views showing a modification of a part of the arrangement.

In the drawings the same reference letters are used to mark the same or like parts wherever they are repeated.

In carrying out my invention as shown on Sheet 1 of the drawings, I fix a stern tube, A, of sufficient length for the stern bearing, with its after end fitted into the eye of the boss, B, formed on the inner stern post, and with its forward or inner end fixed, by flanges formed on it, to a strong transverse plate frame, C.

Within the stern tube, A, I fit a bearing tube, D, lined in the usual way with lignum-vitæ strips, E, and provided with the usual stuffing box, F, at its inner end. This bearing tube, D, is fitted into the stern tube, A, so that it can be withdrawn inward from that tube, and it is made in halves, by longitudinal divisions so that when it has been drawn from the stern tube, A, the halves can be detached and separated from the stern length G of the propeller shaft. A watertight bulkhead, H, is fixed across the stern space, at such a distance forward of the stern bearing as to allow of the bearing tube, D, being conveniently handled and separated from the shaft. When the two halves of the bearing tube, D, are in position within the stern tube, A, they are bound together by that tube, so as to be equivalent to an undivided tube.

Instead of the halves of the bearing tube, D', being held together by the outer stern tube, A, such outer tube may be dispensed with, the halves of the bearing tube being bolted together by means of flanges, J, formed on them as shown on Sheet 2 of the drawings.

What I claim as my invention is—

The combination with the stern length of a propeller shaft, of a bearing tube divided longitudinally into a plurality of parts, adapted to be moved inward, with means for securing the parts together, whereby the said tube may be readily removed from the shaft within the vessel, substantially as and for the purpose set forth.

In testimony whereof I have signed my name to this specification in the presence of two subscribing witnesses.

HECTOR MacCOLL.

Witnesses:
JOSEPH McKAY,
GEORGE BAXTER.